May 22, 1928.                                   1,671,068
E. I. DEUTSCH
ELECTRICAL SYSTEM
Original Filed April 20, 1918
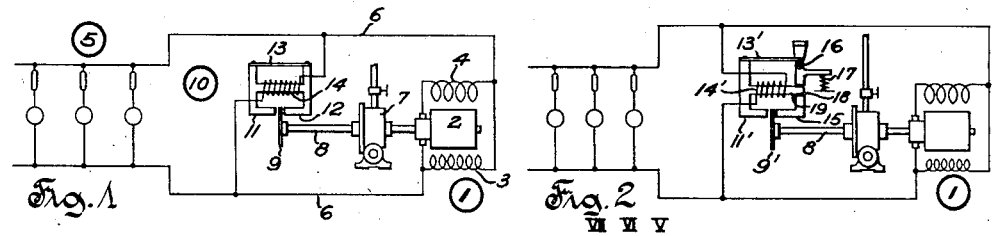
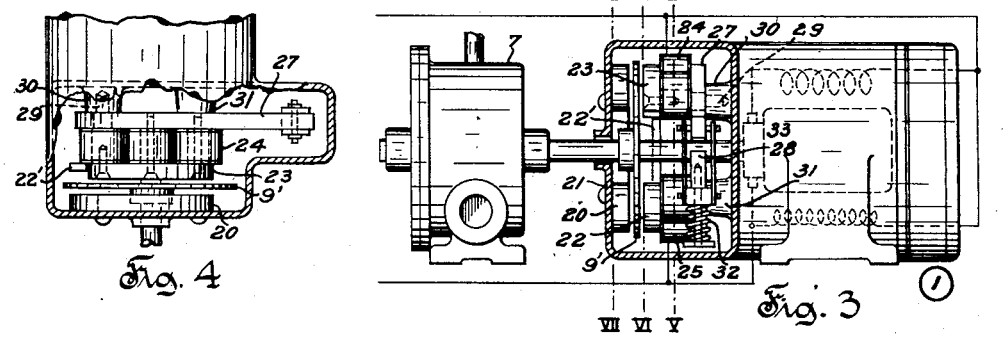
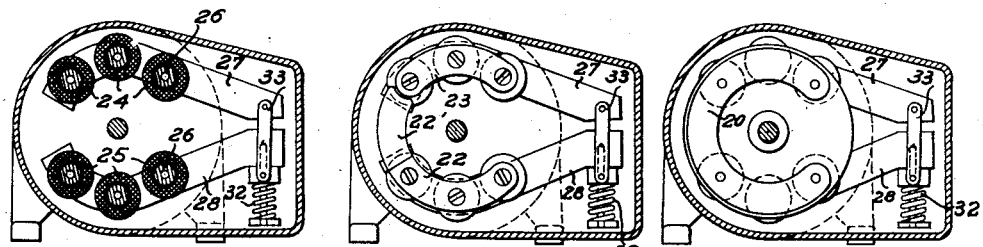
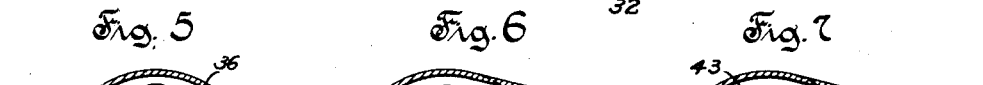
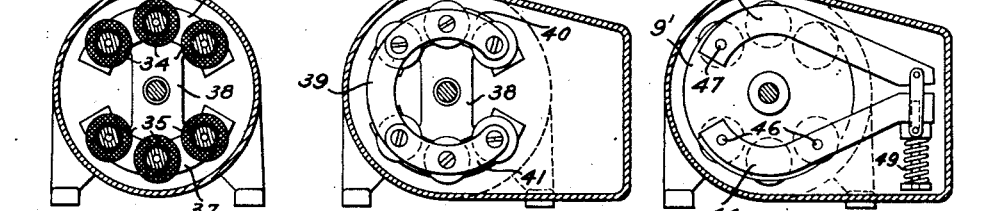
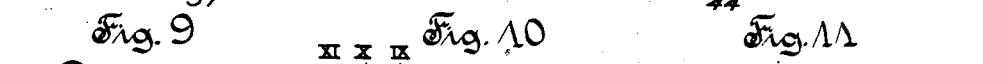
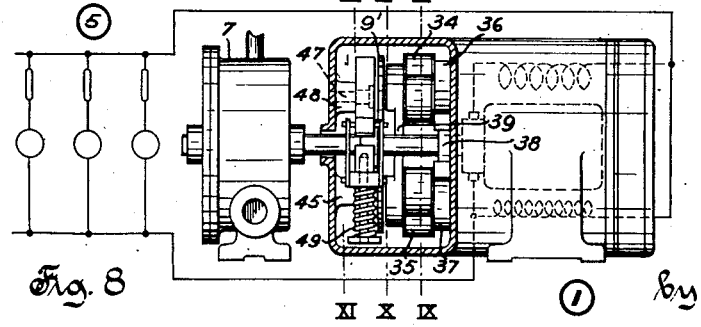

Patented May 22, 1928.

1,671,068

UNITED STATES PATENT OFFICE.

EDWARD I. DEUTSCH, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ELECTRICAL SYSTEM.

Application filed April 20, 1918, Serial No. 233,587. Renewed January 20, 1927.

This invention relates to the construction and control of electrical generators, but may also be applied in the control of other electromagnetic devices of various kinds.

One of the objects of this invention is the production of an electrical generator in which the voltage is kept constant. Another object is the production of an electrical generator in which a constant maximum speed is obtained by substantially limiting the speed so that it cannot exceed a given value.

Another object of the invention is the production of a controlling device for dynamo-electric machines and electro-responsive devices in which variable characteristics of control are obtained in response to certain conditions of the apparatus controlled without resorting to the use of contacts, or in some forms of the invention, to the use of movable members, previously common in such devices. Other objects will appear hereinafter as the description of the invention proceeds.

The novel features of this invention will appear from the specification and the accompanying drawings which form a part thereof and will be particularly pointed out in the appended claims.

Fig. 1 is a diagrammatic showing of the invention applied in connection with a so-called headlight generator.

Fig. 2 is a similar diagrammatic showing of a modified form of the invention.

Fig. 3 is a horizontal elevation of the invention as it may be applied in a headlight generator, with a portion of the casing of the generator broken away.

Fig. 4 is a top view of a portion of Fig. 3.

Figs. 5, 6 and 7 are sections of Fig. 3 along lines V—V, VI—VI, VII—VII, respectively.

Fig. 8 is a front elevation of another modification of the invention as applied in a headlight generator, a portion of the casing of the generator being broken away.

Figs. 9, 10 and 11 are sections of Fig. 8 along lines IX—IX, X—X, and XI—XI.

In Fig. 1 a generator 1 is diagrammatically shown having an armature 2, a shunt field 3 and a series field 4. This generator may supply any desired load 5 through conductors 6, 6. The generator is here shown as being driven by a steam turbine 7 having a shaft 8. A conducting disk 9 may be mounted at any desired place on this shaft and is disposed to rotate between the inwardly extending pole pieces 11, 12 of an H-shaped core 10. The upper legs of this core are bridged by means of what shall be termed a saturation piece 13. The H-shaped core 10 is energized by means of a suitable coil 14 which is here shown as connected across the terminals of the generator.

The operation of the arrangement of Fig. 1 is as follows: Under desired normal conditions the generator will be running at certain predetermined speeds and will be generating a certain predetermined voltage. The coil 14 is so designed that with this voltage applied thereto it will produce a magneto-motive force of such a value that the piece 13 is not saturated. In view of the fact that there is an air gap between the pole pieces 11 and 12 practically no flux will pass across this gap as long as the reluctance of piece 13 is negligible. If now, however, the speed of the generator tends to increase for any reason the voltage thereof will tend to rise a corresponding amount and the coil 14 will produce a greater magneto-motive force. Assuming that the critical speed or voltage has been reached, the piece 13 will begin to become saturated and as a result that will be a more or less abrupt production of lines of force across the gap between the pole pieces 11 and 12 depending upon the magnetic characteristics of piece 13. This flux will immediately produce a magnetic drag upon the disk 9 by inducing eddy currents therein in the well known manner and consequently the speed of the shaft by which the disk 9 is driven will be limited.

The device may be modified, as shown in Fig. 2, by pivotally mounting one of the legs 15 of the H-shaped core at the point 16. The leg 15 is restrained and is normally biased in a counter-clockwise direction by means of the spring 17. The leg 15 is also provided with an aperture 18 which is large enough so that the leg 15 may swing freely without interference from the cross bar 19 upon which the coil 14' is wound. In this form of the invention below predetermined values of current in the coil 14 substantially all of the flux passes through the saturation piece 13' reaching this piece through the upper legs of the H-shaped core member. As the piece 13' becomes saturated under the conditions already described there will be a more or less sudden appearance of flux across the gap between pole pieces 11', 15, and as the pole piece 15 is now free to approach the pole piece 11' by reason of the fact that the leg 15 is pivoted, the latter will rotate in a clockwise direction compressing the spring 17 an amount depending directly upon the strength of the current in the coil 14'. In this manner the increase in flux passing across the disk 9 can if desired be made greater in proportion than it otherwise would be.

In the modification shown in Fig. 3 the disk 9 has disposed on one side thereof a horeshoe-shaped stationary armature 20, which is fastened to the housing 21 (which housing may be a portion of the generator housing if desired) in any suitable manner. On the other side of the disk are disposed two sets of magnets, an upper set 24 and a lower set 25. These magnets are provided with pole pieces 22 and 23, respectively, and as may be seen in Fig. 6, are of arcuate form. The lower pole piece 22 is provided with an extension 22' as may be seen in Fig. 6, and which extension is of less thickness than the pole piece, as may be seen in Figs. 3 and 4. The purpose of this will be hereinafter stated. The magnets 24 and 25 are provided with cores 26 which are here shown as disposed between the pole pieces 22 and 23 and the yoke members 28 and 27, respectively. The arrangement can be best seen in Figs. 3 and 4. The lower yoke 28 is rigidly mounted on bosses 31 on the housing 21 which may be seen in Figs. 3 and 4. The upper yoke 27 is pivotally mounted on a stud 29 mounted in any suitable manner in the boss 30. The yoke 27 may thus swing about the stud 29 and as it does so it carries with it the upper coils 24 and the pole piece 23 fastened thereto. In order that there will not be too much friction between the yoke and the stud and boss these may be made of non-magnetic metal or non-magnetic washers may be used at the proper point if desired. It is clear that it is not necessary that the yoke 27 carry with it the coils 24, but the latter may be rigidly mounted and the yoke alone pivoted and simply swung in close proximity to the cores of the magnets. The yoke 27 is biased away from the yoke 28 by any suitable biasing means here shown as a spring 32, force being transmitted to that spring by means of the bars 33.

The operation of the modification shown in Figs. 3 to 7, inclusive, is as follows: The normal path of the flux produced by coils 24 and 25 is, assuming, merely for example, that the pole piece 23 has north polarity, through the extension 22' to the pole piece 22 which should, in this instance, be of south polarity, through the cores of the magnets 25 through the yoke 28 across the air gap, yoke 27, along this yoke through the cores of magnets 24 back to the pole piece 23. The extension 22' corresponds to the saturation piece 13 of Figs. 1 and 2 and as the normal current in the coils 24, 25 is exceeded, this piece becomes saturated and flux passes across and through the disk 9' from pole piece 23 to the upper leg of the horseshoe-shaped armature 20, through this member to the lower leg thereof, from there across the air gap through the disk 9' to the pole piece 22, through the cores of magnets 25 through the yoke 28 across the air gap to the yoke 27 through the cores of magnet 24 back to the pole piece 23. There is, therefore, a comparatively sudden increase of strength of field in the gap between the yokes 27 and 28 and in consequence the yoke 27 will be swung about the stud 29 and the gap will be closed depending upon the strength of the spring. It is obvious that any desired strength of spring may be used and that the tension thereof may be made adjustable. It will be seen that at a given voltage of the generator there will again be a greatly increased braking effect produced by the magnetic drag on the disk 9'.

In the modification disclosed in Fig. 8 the upper and lower sets of magnets 34 and 35 are rigidly mounted within the casing, the upper set being mounted on an arcuate member 36 and the lower set on a similar member 37, which members may be integrally connected by means of a bridge 38 or held together in any other suitable manner. Pole pieces 40 and 41 of arcuate form are provided for the upper and lower sets respectively. A saturation piece 39 may, in this case, be integral with both the upper and lower pole pieces 40 and 41 inasmuch as the upper pole piece is not movable as is the pole piece 23 of the modification shown in Figs. 3 to 7. It is clear, however, that, if desired, the piece 39 may be separately made or constructed in the same manner as previously described in connection with the piece 22'. On the opposite side of the disk 9' from the magnets 34 and 35 are disposed two yoke pieces 43 and 44. The lower yoke piece 44 is fastened in any suitable manner by means 46 to the bosses 45. The upper yoke piece 43 is pivotally mounted on a stud 47 held in a boss 48. The pivoted yoke piece 43 is biased by a spring means 49 in a manner already described in connection with Fig. 3.

The operation of the device disclosed in Figs. 8 to 11, inclusive, is as follows: Under normal conditions with a predetermined current passing through coils 34 and 35 substantially all of the flux passes from pole piece 40 through saturation piece 39, pole piece 41, through the cores of magnets 35 to arcuate member 37, bridge 38, arcuate member 36, and back to the pole piece 40. When the piece 39 becomes saturated there will be a more or less sudden appearance of flux passing from pole piece 40 across the gap and through the disk 9' to yoke 43, down this yoke across the gap to yoke 44 and from there across the gap and through the disk 9' to pole piece 41, from thence through the cores of magnets 35, member 37, bridge 38, member 36, the cores of magnets 34 back to the pole piece 40. Here, as in the form of Fig. 3, the pivoted yoke will close the air gap between the yokes and thus cause an added increase of lines of force producing a magnetic drag upon the disk 9'.

It will be seen that this invention provides a controlling device having varying controlling characteristics and may be adjusted, for example, by changing the point of saturation of the saturation piece, by adjusting the strength of the spring controlling the movable yoke or by both expedients or any other obvious method apparent to those skilled in the art, the controlling device operating when once adjusted to effect variable control without the necessity for the actuation of relays or electrical contacts or, in some forms of the invention, of movable members.

It should be understood that it is not desired that the invention claimed be limited to the exact details shown and described, for obvious modifications will occur to a person skilled in the art.

It is claimed and desired to secure by Letters Patent:

1. In combination, a dynamo-electric machine, a movable conducting disk driven from the shaft of said machine, a magnetic circuit having poles disposed on opposite sides of said disk, a winding for energizing said circuit connected across the terminals of said machine, the reluctance of said magnetic circuit being variable in response to the current in said winding, and a shunt for said magnetic circuit which is substantially saturated at a predetermined value of current in said winding.

2. In combination, a dynamo-electric machine, a conducting disk movable in unison with the rotor of said machine, a magnetic circuit having an air gap in which said disk is disposed, said magnetic circuit being of variable reluctance, a winding for energizing said magnetic circuit, and a saturable magnetic shunt for said magnetic circuit.

3. In combination, a dynamo-electric machine, a conducting disk movable in unison with the rotor of said machine, a magnetic circuit including parallel paths through a portion thereof and having magnetic lines for retarding said disk, and adjustable means responsive to a characteristic of the energy of said machine for causing such change in the distribution of the magnetic lines in the parallel paths of said magnetic circuit as to automatically render the effective magnetic flux cut by said disk directly responsive to the voltage of the machine to a greater degree when the voltage is above a predetermined value than when below said value.

4. In combination, a rotatable disk, a horseshoe-shaped magnetic member disposed on one side of said disk, two magnets having pole pieces disposed on the other side of said disk, the pole pieces being disposed to coact with the respective sides of said horseshoe-shaped member, yoke pieces one of which is movable for coacting with said member, and means for normally holding said yoke pieces separated.

5. In combination, a rotatable disk, a horseshoe-shaped magnetic member disposed on one side of said disk, two magnets having pole pieces disposed on the other side of said disk, the pole pieces being disposed to coact with the respective sides of said horseshoe-shaped member, a saturable magnetic member bridging said pole pieces, yoke pieces one of which is movable for coacting with said member, and means for normally holding said yoke pieces separated.

6. In combination, a magnetic circuit comprising two parallel paths, means for energizing the circuit, one of said paths being of variable reluctance and a movable conducting disk disposed in said path, the other path being so proportioned as to become saturated before the first mentioned path.

7. In combination, a magnetic circuit including parallel paths through a portion thereof and a movable conducting disk disposed in said circuit, means for energizing the circuit, means for altering the distribution of flux in said parallel paths in response to said energizing means so that at given appreciable strengths of said energizing means substantially no flux passes through the disk and at another strength an appreciable flux passes therethrough, said altering means including means for causing variation in the reluctance of a portion of said magnetic circuit.

8. In combination, a magnetic circuit including parallel paths through a portion thereof and a movable conducting disk disposed in said circuit, means for energizing the circuit, means for altering the distribution of flux in said parallel paths in response to said energizing means so that at given appreciable strengths of said energizing means substantially no flux passes through the disk and at another predetermined and variable strength an appreciable flux passes therethrough, said alternating means including means for insuring relative movement between portions of said magnetic circuit.

9. In combination, a magnetic circuit including parallel paths through a portion thereof, a movable conducting disk disposed in said circuit, means for energizing the circuit, adjustable means for causing a sudden change in the distribution of flux in said parallel paths in response to said energizing means so that at given appreciable strengths of said energizing means substantially no flux passes through the disk and at other strengths an appreciable flux passes therethrough.

10. In combination, an electrical power circuit, and a controlling device comprising an electromagnetic field element, said field element comprising a flux-producing portion, a plurality of return paths for flux, one of said return paths having a plurality of polar portions, and means associated with said flux-producing portion for energizing the latter to a degree dependent upon a characteristic of the electrical energy of said circuit, and an armature responsive to flux across said polar portions, one of said return paths including a portion movable in response to a predetermined current in said energizing means for causing variation in the reluctance of said path.

11. In combination, a generator operative to supply a power circuit, and means for exercising a controlling effect upon said circuit, said controlling means comprising a magnetic circuit having a gap portion and a readily saturable shunt magnetic path, a movable element electromagnetically associated with the gap portion of said magnetic circuit, and an energizing winding for said magnetic circuit having a flux-producing effect on said movable element which is a minimum when the electrical energy supplied to said power circuit is of normal or full load value and which is a maximum when said current is of abnormal value.

12. In combination, an electrical power circuit, means for supplying current thereto, and means for exercising a controlling effect upon said power circuit, said controlling means comprising an electromagnetic device having an energizing winding carrying current responsive to a characteristic of the energy of said circuit, said electromagnetic device comprising two parallel magnetic paths, one of said paths being of variable reluctance, and the other path being more readily saturable than said first mentioned path, and a movable element variably responsive to the current of said energizing winding.

13. In combination, an electrical circuit, means for exercising a controlling effect on said circuit, said means comprising a magnetizable core member having a plurality of parallel magnetic paths, a winding for energizing said core member, a movable armature element variably responsive to energization of said core, and means responsive to a characteristic of the energy of said circuit for causing variation in the relative reluctance of said parallel magnetic paths and consequent variation in the torque effect on said movable armature element.

14. In combination, an electrical power circuit, a device for exercising a controlling effect on said circuit, said device comprising a magnetizable core member having a plurality of parallel magnetic paths, a movable armature operatively associated with one of said paths and variably responsive to energization of said core, and means for energizing said core member to a degree dependent upon the electrical energy of said circuit and causing a change in the distribution of flux in said parallel paths so that at a given appreciable strength of said energizing means substantially no effective flux acts upon said armature and under another condition a substantial flux acts on said armature.

15. In combination, an electrical power circuit, a device for exercising a controlling effect on said circuit, said device comprising a magnetizable core member having a plurality of parallel magnetic paths, and means for energizing said core member to a degree dependent upon the energy of said electrical circuit and for causing a change in the distribution of flux in said parallel paths so that at a given appreciable strength of said energizing means there is substantially no effective flux passing through one path and under other conditions an effective controlling flux passes.

16. In combination, an electromagnetic device having parallel magnetic circuits of different reluctance, a movable element responsive under certain conditions to energization of said electromagnetic device through one of its parallel magnetic paths, and means whereby the relative reluctance of said magnetic paths is automatically varied in response to predetermined conditions of energization of said electromagnetic device.

17. In combination, a magnetic circuit comprising two parallel magnetic paths, and means for energizing said magnetic circuit, the reluctance of one of said paths being variable in response to the degree of energization of said magnetic circuit, and the other path being so proportioned as to become saturated before the first mentioned path, and a movable element electromagnetically responsive to the energization of said magnetic circuit.

18. In a controlling device for an electrical circuit, an electromagnetic device comprising a rotatable armature of conductive material, and means for causing the production of magnetic flux of a desired character through said armature, said means including a field element having relatively movable portions of magnetic material adapted through their relative movement to cause variation in the reluctance of the path through said field element and said armature, and polar portions between which said armature is adapted to operate, and an energizing winding for said field element, said electromagnetic device being operatively responsive to the degree of energization thereof to cause variation in the magnetic reluctance of the magnetic field.

19. In combination, an electrical power circuit, means for supplying current thereto, and means for exercising a controlling effect upon said power circuit, said controlling means comprising an electromagnetic device having a magnetic circuit, an energizing winding therefor, said magnetic circuit comprising relatively movable portions of magnetic material, a movable element including a portion of conductive material electromagnetically associated with said magnetic circuit and responsive to effects of said energizing winding, the energizing effect of said winding being responsive to a characteristic of the energy of said power circuit and being thereby effective to cause variation in the reluctance of the magnetic circuit through said movable parts and consequent variation in the magnetic effect produced on said movable element.

20. In a controlling device for an electrical circuit, an electromagnetic device, comprising a field element of magnetic material having movable portions in series in the magnetic circuit through said field element and adapted to vary the reluctance of said magnetic circuit, a rotatable armature of conductive material cooperative with a polar portion of said field element, and an energizing winding carrying current proportional to the voltage of said electrical circuit for causing variation in the reluctance of said magnetic path and the effective flux therethrough in response to variation in the voltage of said circuit.

In testimony whereof, the signature of the inventor is affixed hereto.

EDWARD I. DEUTSCH.

CERTIFICATE OF CORRECTION.

Patent No. 1,671,068.     Granted May 22, 1928, to

EDWARD I. DEUTSCH.

It is hereby certified that error appears in the printed specification of the above numbered patent requiring correction as follows: Page 3, line 126, claim 8, for the word "alternating" read "altering"; and that the said Letters Patent should be read with this correction therein that the same may conform to the record of the case in the Patent Office.

Signed and sealed this 10th day of July, A. D. 1928.

(Seal)

M. J. Moore,
Acting Commissioner of Patents.